United States Patent

Huang et al.

[11] Patent Number: 5,585,877
[45] Date of Patent: Dec. 17, 1996

[54] SPROCKET MECHANISM FOR CAMERAS

[75] Inventors: Yeou-Fu Huang, Taichung; Jong-Shing Lin, Feng Yuan City, both of Taiwan

[73] Assignee: Sinpo Optical Co., Ltd., Taichung, Taiwan

[21] Appl. No.: 525,020

[22] Filed: Sep. 8, 1995

[51] Int. Cl.⁶ .................................................. G03B 1/00
[52] U.S. Cl. ............................................ 396/399; 396/397
[58] Field of Search .................................. 354/212, 213, 354/215, 217, 218

[56] References Cited

U.S. PATENT DOCUMENTS

| | | | |
|---|---|---|---|
| 4,780,734 | 10/1988 | Ogawa et al. | 354/173.11 |
| 5,298,930 | 3/1994 | Asakura et al. | 354/212 |
| 5,453,808 | 9/1995 | Zawodny et al. | 354/212 |
| 5,508,770 | 4/1996 | Lawther | 354/214 |

Primary Examiner—David M. Gray
Attorney, Agent, or Firm—Bacon & Thomas

[57] ABSTRACT

A sprocket mechanism for cameras adapted for advancing a film provided with two juxtaposed sprocket holes at regular space intervals includes a sprocket with a body having a couple of pawls spaced apart at a pre-determined distance at a circumferential rim thereof and a first gear disposed on a top side of the body and having a notch at a suitable position thereof, a transmission gear having a second gear formed on its top side, the second gear having a shaft extending from a bottom side thereof and being inserted into a central hole of the first gear, the shaft capable of free movement within the central hole and having a stop element fitted thereon, the stop element being provided with a vertical segment at an extreme end thereof to be retained in the notch of the first gear. When the pawls of the sprocket engage the sprocket holes of the film, the sprocket, the transmission gear and the stop element rotate synchronously. After the sprocket has rotated through a certain angle, the pawls will come into contact with the film and the stop element will absorb the transmitted rotational speed to ensure the positioning of a single frame of the film.

2 Claims, 4 Drawing Sheets

SPROCKET MECHANISM FOR CAMERAS

BACKGROUND OF THE INVENTION

1. Field of the Invention

The present invention relates generally to a sprocket mechanism for cameras, and more particularly to a sprocket mechanism adapted for use with a newly developed film construction to ensure positioning of a single frame of the film at every advancing action.

2. Description of the Prior Art

FIG. 1 shows an existing film roll structure 10 which comprises a substantially hollow cylindrical magazine 11 and a spool 13 axially disposed in the center of the magazine 11. A film 14 is wound around the spool 13 and may be pulled via a notch 12 at a side of the magazine 11. The top and the bottom sides of the film 14 are provided with a multiplicity of sprocket holes or perforations 15. This kind of film rolls have been used for many years and are quite practical indeed.

With the development of modern technology, some manufacturers have recently developed a new kind of film rolls which are more performing and compact in size than conventional ones. Referring to FIG. 2, such a new film roll 20 is mainly characterized in that a top side of a magazine 21 is configured to have four different signs 22 and that a location plate 23 located at an inner wall of the top side of the magazine 21 will, following the action of the film roll 24, be situated at one of the signs 22 to represent the use status of the film roll 20. And besides, a film 25 of the film roll is provided with two juxtaposed sprocket holes 26 at regular space intervals (such as those illustrated in FIG. 2) for stressing the uniqueness of each individual frame. In other words, the exposure position of each frame is predetermined, unlike the conventional film rolls in which the exposure position of each frame is determined by the length of the leader pulled out when mounting the roll into the camera and by the length of the film wound upon film advancing, hence the lack of efficient film planning. The new film roll also provides an improvement for matching some structural parts of the camera to permit tight winding of the film 25, further reducing the size of a film compartment defined between the magazine 21 and the spool 24 for accommodating the film 25. In order to match the new kind of film rolls recently developed, novel improvement on the construction of the camera is therefore necessary.

With reference to FIG. 3 which shows a sprocket mechanism 30 and a roller mechanism 31 for assisting the advancing of films in conventional cameras, both the sprocket mechanism 30 and the roller mechanism 31 are driven by a motor via a plurality of gears 33 and planetary gears 34 to perform an advancing action on the film. However, it may be found that the sprocket mechanism 30 is proportionally provided at its circumferential rim with eight pawls 301 which may randomly engage with the series of sprocket holes of the film for transmission purposes. This arrangement, however, cannot and do not suit the new kind of film roll 20 with pre-determined film planning.

SUMMARY OF THE INVENTION

A primary object of the present invention is to provide an improved sprocket mechanism for cameras, which not only provides the function of film advancing as in the prior art but also ensures positioning of each frame of the film.

BRIEF DESCRIPTION OF THE DRAWINGS

The foregoing and other features and advantages of the present invention will be more clearly understood from the following detailed description and the accompanying drawings, in which.

DETAILED DESCRIPTION OF THE PREFERRED EMBODIMENT

Figure 2:
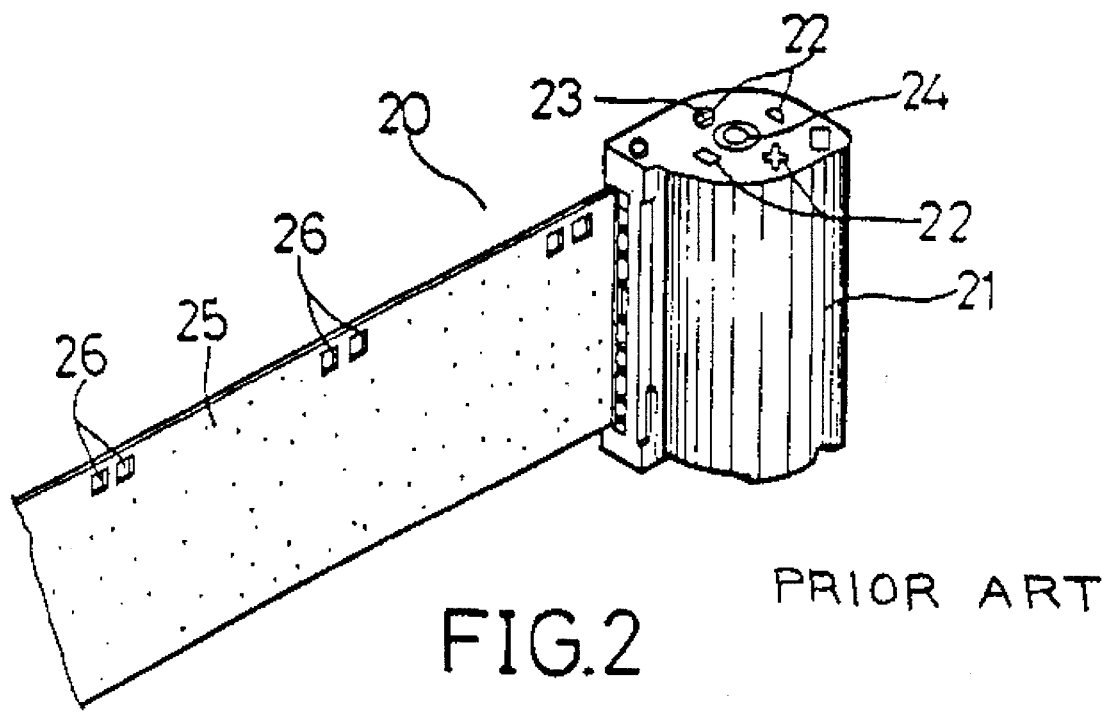
FIG. 2 is a perspective view of a new kind of film roll.
Figure 1:
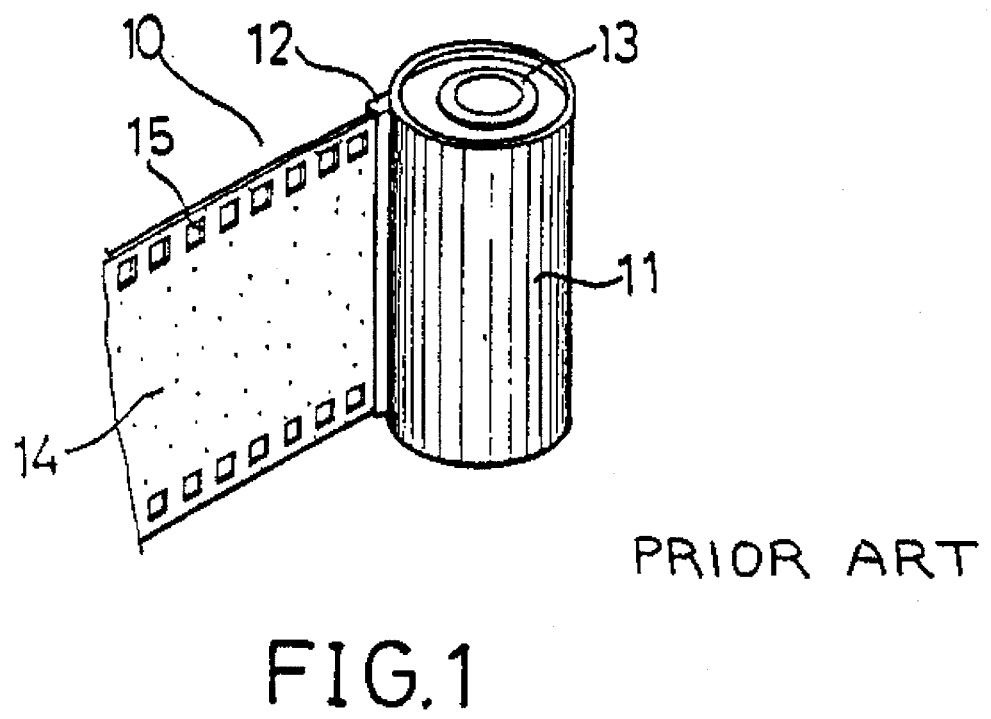
FIG. 1 is a perspective view of a conventional film roll.
Figure 3:
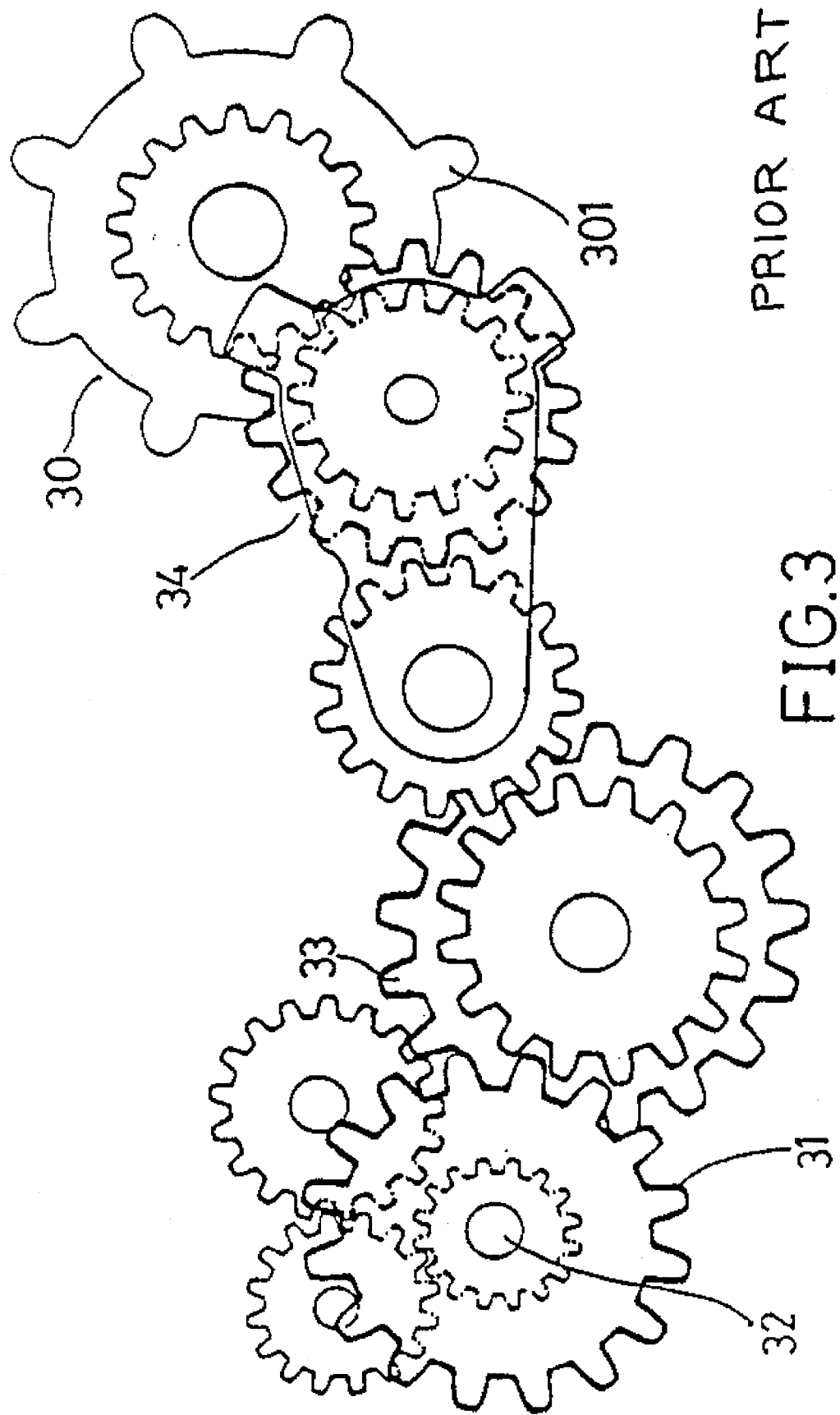
FIG. 3 is a schematic view of the sprocket mechanism and roller mechanism adopted in conventional cameras.
Figure 4:
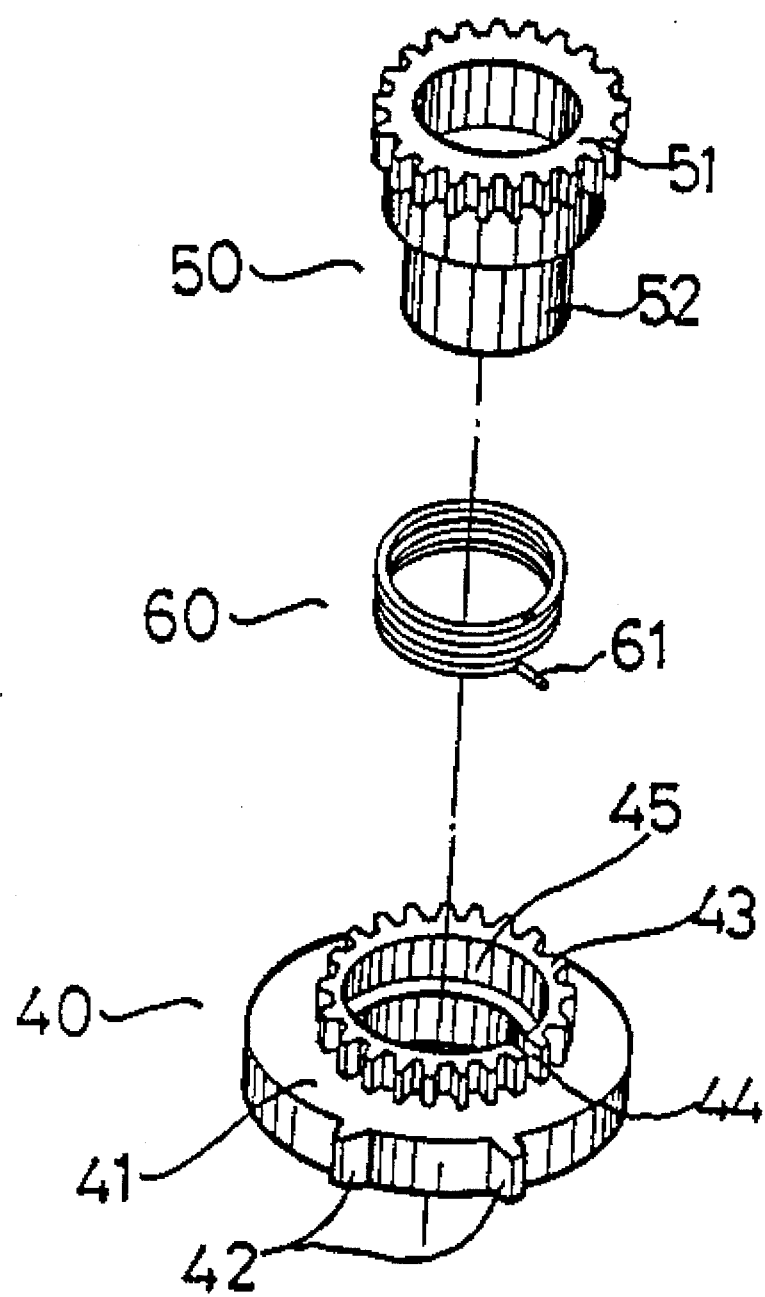
FIG. 4 is a perspective exploded view of a preferred embodiment of the present invention.
Figure 5:
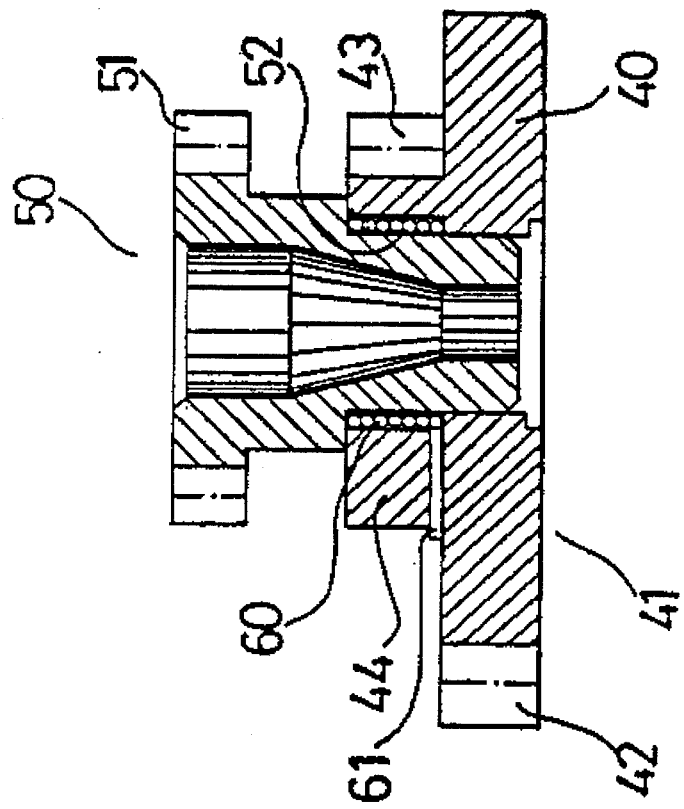
FIG. 5 is a sectional view of the preferred embodiment of the present invention in an assembled state.

The sprocket mechanism according to the present invention is a transmission mechanism for film advancing used in cooperation with the new film system lately available on the market. FIGS. 4 and 5 show a preferred embodiment of the present invention, which comprises a sprocket 40, a transmission gear 50 and a stop element 60.

The sprocket 40 has a body 41 circumferentially provided with a couple of pawls spaced apart from each other at a pre-determined distance. The sprocket 40 further has a first gear 43 with a certain thickness provided on a top side thereof. The first gear 43 is provided with a notch 44 at a suitable position of its circumference.

The transmission gear 50 is provided with a second gear 51 at a top side thereof. The second gear 51 is engageably connected to a transmission gear of a motor (not shown). The second gear 51 further has a shaft 52 extending from a bottom side thereof, the shaft 52 having a diameter slightly smaller than that of a central circular hole 45 of the first gear 43, so that there is a clearance permitting movement of the shaft 52 when the shaft 52 is fitted into the hole 45.

The stop element 60 is fitted onto the shaft 52. The stop element 60 may be a friction resilient piece or a spring. In this embodiment, a spring 60 is adopted. The spring 60 further has a vertical segment 61 provided at an extreme end thereof. The vertical segment 61 is retained in the notch 44 of the first gear 43.

Figure 6:
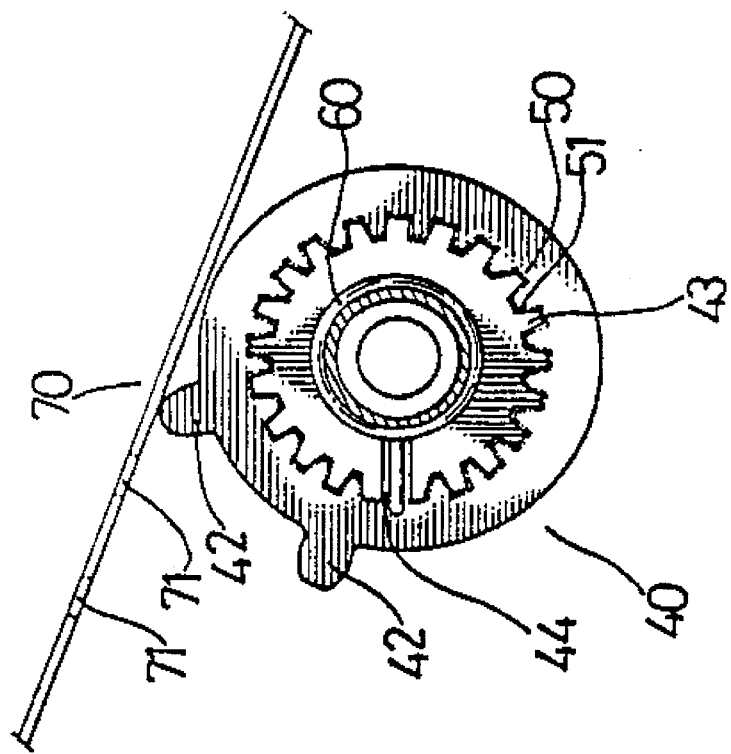
FIG. 6 is a schematic view illustrating the actions of the preferred embodiment of the present invention.

The structural elements of the sprocket mechanism according to the present invention and their relationship are described as above. Reference is now made to FIG. 6 which illustrate the actions of the sprocket mechanism of the present invention. As shown in FIG. 6, a new kind of film 70 is provided with two juxtaposed sprocket holes 71 at regular space intervals. When the film 70 is being advanced, the second gear 51 engageably connected to the transmission gear of the motor (not shown) starts turning. At this moment, the sprocket 40, the transmission gear 50 and the stop element 60 are synchronously turned therewith. By means of its pawls 52 engaging the sprocket holes 71 of the film 70, the sprocket 40 assists in the transmission action. After the sprocket 40 has turned through a certain angle, its pawls 42 will come into contact with the film 70. Since the sprocket 40, the transmission gear 50 and the stop element 60 are interconnected, under the condition that any one of them is not subjected to an external checking force, they will turn as an integral whole. However, when any one of them is subjected to an external force, they will be compelled to move individually on their own. Thus, when the sprocket 40 is checked by the film 70, the rotational speed intended to transmit to the sprocket 40 by the second gear 51 is absorbed by the stop element 60, that is, the second gear 51 will be in idle rotation and the sprocket 40 will not rotate therewith temporarily. On a second advancing action, the couple of sprocket holes 71 of the film 70 will approach the sprocket 40 and engage the pawls 42. Then the sprocket 40 will, again, synchronously rotate with the transmission gear 50 to advance another frame of the film 70. By this arrangement, it may be ensured that a single frame of the film is positioned upon every advancing action.

In view of the aforesaid, the sprocket mechanism for cameras according to the present invention is directed to match a new kind of film rolls and to ensure positioning of a single frame of the film upon every advancing action, providing substantial improvement over the prior art as well as a novel construction.

Although the present invention has been illustrated and described with reference to the preferred embodiment thereof, it should be understood that it is in no way limited to the details of such embodiment but is capable of numerous modifications within the scope of the appended claims.

What is claimed is:

1. A sprocket mechanism for cameras adapted for a film construction which is provided with a pair of juxtaposed sprocket holes at regular space intervals in a top edge portion thereof, said sprocket mechanism comprising:

a sprocket having a body provided with a pair of pawls spaced apart from each other at a pre-determined distance, said sprocket being provided with a first gear at a top side thereof, said first gear having a notch on a circumferential rim thereof;

a transmission gear having a second gear formed on a top side thereof, said second gear having a shaft extending from a bottom side thereof, said shaft being fitted into a central circular hole of said first gear such that a clearance is formed therebetween to permit free movement of said shaft within said central circular hole; and a stop element fitted onto said shaft and having a vertical segment at an extreme end thereof, said vertical segment being retained in said notch of said first gear; whereby when said pawls of said sprocket engage said sprocket holes of the film, said sprocket, said transmission gear and said stop element rotate synchronously as a whole, and after said sprocket has turned through a certain angle and when said pawls come into contact with the film, said stop element will absorb the transmitted rotational speed, ensuring positioning of a single frame of the film.

2. A sprocket mechanism for cameras as claimed in claim 1, wherein said stop element is a frictional resilient piece or a spring.

\* \* \* \* \*